Oct. 9, 1962   F. W. ROBSON   3,057,479
PEEL TRAP
Filed July 23, 1959
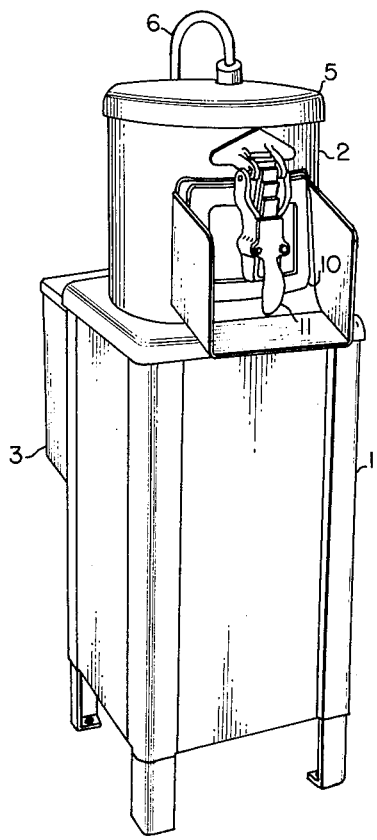
Fig. I
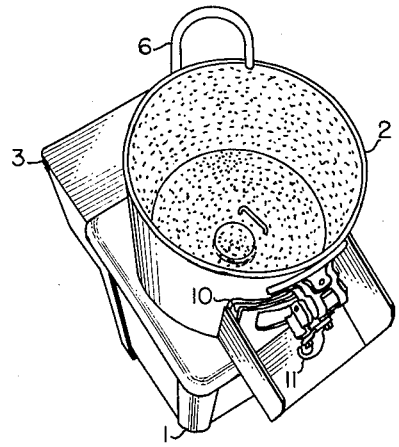
Fig. II
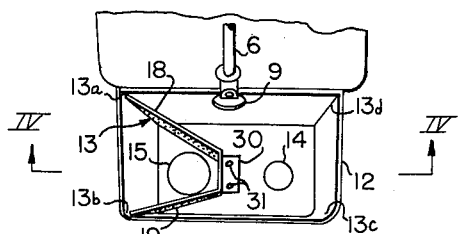
Fig. III
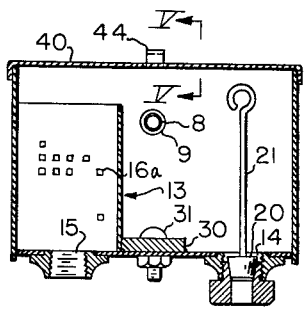
Fig. IV
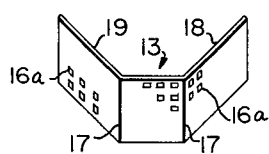
Fig. VI
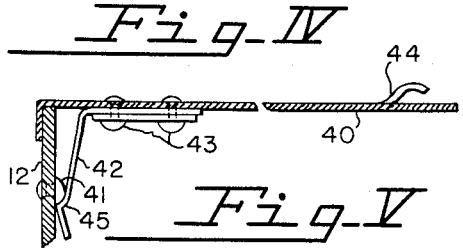
Fig. V
INVENTOR.
FREDERICK W. ROBSON
BY
Marshall, Marshall & Yeasting
ATTORNEYS

United States Patent Office 3,057,479
Patented Oct. 9, 1962

3,057,479
PEEL TRAP
Frederick W. Robson, Rochester, N.Y., assignor to Toledo Scale Corporation, Toledo, Ohio, a corporation of Ohio
Filed July 23, 1959, Ser. No. 829,080
4 Claims. (Cl. 210—232)

This invention relates to improvements in peeling machines and in particular to an improved refuse trap for such machines.

Vegetable peeling machines of the type to which the improved peeler trap of this invention is applied include means for peeling vegetables by moving them, by the undulating action of a wavy abrasive covered disc, within an abrasive lined stationary cylinder. The wavy disc imparts a rolling motion to the vegetables which exposes the peel to the abrasive on both the cylinder and the disc. While the rolling motion continues, water is introduced into the cylinder whereby ground peelings are washed from the vegetables.

The principal object of this invention is to provide an improved strainer which automatically separates the peel refuse from the water in a peeling machine trap which strainer is vibration free, vertically stiff and needs no special securing means to hold it in place.

More specifically the principal object of the invention is to provide a strainer for a peeling machine trap comprising a substantially flat perforated resilient sheet having at least one crease parallel to the vertical edges of the sheet, the crease permitting the strainer to be held in the trap by being sprung between opposite walls and preferably between adjacent corners of the trap which eliminates the need for special securing means and imparts vibration-free, vertical stiffness to the strainer.

Another object of the invention is to provide an improved peeling machine trap having a removable vertically stiff strainer located vertically in the trap and held in place under tension between opposite walls of the trap, dividing the trap into two parts, one part having an outlet for the solid portion of the refuse and the other part having an outlet for water separated from the refuse, the strainer optionally being located between adjacent corners at either end of the trap whereby said parts of the trap optionally may be used as retainers for the solid portion of the refuse or for water separated from the refuse.

More specific objects and advantages are apparent from the following description of a specific embodiment of the invention.

According to the invention, a peeling machine is provided with a refuse trap comprising a box-like receptacle having a refuse inlet in one of its sides, and a rectangularly shaped perforated sheet having at least one vertical crease which imparts vertical stiffness and a flattened V-shaped or U-shaped form to the sheet, said sheet being positioned vertically in the receptacle and being held in place under compression by being sprung between opposite walls, for dividing the receptacle into two parts, one part having an outlet in its bottom for the solid portion of the refuse and the other part having an outlet in its bottom for water separated from the refuse.

More particularly the peeler trap comprises a box-like receptacle having a refuse inlet. Two adjacent corners of the receptacle form substantially ninety degree angles. The two remaining corners of said receptacle being curves of small radii producing a smoothly contoured exterior on three sides. A rectangularly shaped perforated resilient sheet having at least one, preferably two, vertical creases forming two sides or legs of unequal length. This sheet is positioned vertically in the receptacle and is held in place under compression between opposite walls of the receptacle to divide the receptacle into two parts. The edge of the longer of the two unequal length sides or legs is preferably positioned in one of the ninety degree corners. The edge of the shorter of the two unequal length sides or legs bears against the wall of the receptacle between the two contoured corners. If desired a stop member or retainer member may be attached to the bottom of the receptacle so that when the sheet is positioned as described above in the receptacle the outside of the bottom edge of the sheet furthermost away from the engaged corners also engages the stop or retaining member further holding said sheet in place.

The invention may be more readily understood from the following detailed description of a specific embodiment in which reference is made to the accompanying drawing.

In the drawing:

FIG. I is a perspective view of a peeling machine embodying the invention, showing the position of the improved refuse trap;

FIG. II is a perspective view of the interior of the peeling machine shown in FIG. I;

FIG. III is a perspective view of the interior of the refuse trap showing the position of the improved strainer held in the trap by being sprung between opposite walls;

FIG. IV is an enlarged cross sectional view of the trap taken along the lines IV—IV of FIG. III;

FIG. V is an enlarged cross sectional view of the improved peeler trap cover;

FIG. VI is a front elevational view of the improved strainer.

The peeling machine which is illustrated in the figures above described is of the general type shown and described in United States Patent No. 1,923,806 to George P. Anstiss. The machine has three units, namely, a base 1 housing a motor, a stationary cylinder 2 supported by the base, and a peeler trap 3 to the rear of the base and below the stationary cylinder.

The stationary cylinder 2 houses a peeling disc 4 similar to the one shown in detail in FIG. 6 of United States Patent No. 1,923,806 and is removably mounted on the end of a motor-driven shaft which extends from the base 1 upwardly into the bottom of the stationary cylinder.

Vegetables to be peeled are fed into the stationary cylinder 2 through a hopper 5 and fall upon the revolving peeling disc and at the same time water is fed through a pipe 6 located in the upper portion of the stationary cylinder 2. The vegetables are rolled within the stationary cylinder 2 by the action of the revolving peeling disc 4 and contact sharp abrasive surfaces of the cylinder walls and the peeling disc whereby the peel is ground from the vegetables, as is well understood in the art. The water makes a mixture with the peelings and cleans the cylinder 2 forming refuse that flows between the edge of the peeling disc and the walls of the cylinder to the bottom of the cylinder under the disc 4 and out of an opening of a pipe 8 which empties the refuse through a refuse inlet 9 into the peeler trap 3 as best shown in FIGS. III and IV. The peeled vegetables are discharged from the cylinder 2 through a water-tight door 10 operated by means of a handle 11.

The present invention consists in providing an improved peeler trap for the peeling machine. The refuse mixture of water and ground peelings enters a box-like receptacle 12 of the trap 3 through the refuse inlet 9 and is separated into water and solid refuse by means of a strainer 13 located vertically between opposite walls and preferably between adjacent corners 13a and 13b of the receptacle 12. The strainer 13 divides the receptacle into two parts, one part having an outlet 14 for the solid portion of the refuse and the other part having an outlet 15 for water separated from the refuse. The peeler trap automatically separates the water from the solid portion of the refuse and can be emptied without shutting down the peeling machine. The peelings can be emptied directly into a waste can and the water, free of solid material, may be permitted to flow into a sewer drain.

The strainer 13 comprises a perforated resilient sheet 16 rectangular in preform but having at least one vertical crease 17 formed therein to provide at least two rectangular sides of unequal lengths. The perforations are designated at 16a. There are advantageously two such creases parallel to a vertical edge of the sheet. The creases 17 permit the strainer 13 to be held securely in the receptacle 12 of the peeler trap 3 by being sprung between opposite walls. This method of holding the strainer 13 in the receptacle 12 eliminates any need of special securing means for the strainer, such as screws or hooks, and allows the strainer to be easily and quickly inserted or removed.

The vertical creases 17 impart vertical stiffness to the resilient sheet 16 when the sheet is held under compression between opposite walls of the receptacle 12. This stiffness prevents the sheet 16 from vibrating when refuse is being strained. This is a great advantage, since it permits the strainer 13 to be made from a thin inexpensive resilient sheet.

Thus the peeler trap comprises a box-like receptacle 12 having a refuse inlet 9. Two adjacent corners 13a and 13d form substantially ninety degree angles. The two remaining corners 13b and 13c are curves of small radii producing a smoothly contoured exterior on three sides of the receptacle 12. A rectangularly shaped perforated resilient sheet 13 having at least one vertical crease 17, and preferably two, is utilized as a screen or strainer. The creases 17 form two sides or legs 18 and 19 of unequal length. The longer side 18 advantageously fits in the ninety degree corner 13a. Since the adjacent corner 13b is rounded the side or leg 19 cannot be as long and since the sheet is to be under spring type compression the leg 19 advantageously bears against the wall intermediate the two rounded or contoured corners 13b and 13c to prevent refuse from slipping past that vertical edge. The sheet 13 may have a plurality of vertical creases so long as the U-shape formed thereby still retains a spring type compression when the two legs 18 and 19 bear against the above-described positions.

The receptacle 12 is therefore divided into two parts where, as shown in the drawing, water may drain through a hole 15 to a sewer and the refuse may be taken from the receptacle 12 through the hole 14 after a plug 20 having an upwardly extending handle 21 is removed. The handle 21 allows the plug to be removed without touching the refuse.

A stop or retaining member 30 may be attached to the bottom of the receptacle 12 by the nut and bolt means 31 if desired. When so placed, the outside of the lower edge or bottom of the sheet or screen 13 bears against the stop or retaining member 30 to further hold the screen in place.

A cover 40 for the receptacle 12 has its means for being disengageably connected to the receptacle 12 shown in FIG. V. A raised portion which may be a button or rivet 41 is attached to one side of the receptacle 12 near the top. A spring member 42 engaging the button 41 is attached to the cover or lid 40 by any suitable means such as the rivets 43. The spring 42 has an angled contact area 45 which will lift the spring 42 while it is sliding over the button 41 and will then drop into engaging position when the angled contact area 45 is past the button 41. A handle 44 may be formed from the lid or cover 40 or may be attached by rivets in a manner similar to the spring attaching means 43.

The strainer or screen sheet 13 has been formed to take up less than half of the area of the receptacle since plumbing connections for the inlet water pipe 6 are often made across the middle of the receptacle 12 or on one side of it, making it difficult to remove prior art strainers. The strainer in combination with the cooperating apparatus of this invention needs only to have less than one-half of the vertical area above the receptacle clear so that the strainer can be removed for cleaning purposes.

The improved strainer 13 has, thus, several advantages. It is formed from a thin inexpensive sheet which is easily creased whereby the cost of manufacture is very low. The strainer is held in place under compression between opposite walls of the receptacle so that no special securing means are needed whereby the cost of manufacture of the peeler trap is reduced. However, the low cost strainer at the same time is improved. It may be easily and quickly inserted or removed from the peeler trap, it is horizontally and vertically stiff and does not vibrate, and it can be optionally placed between two adjacent corners at either end of the trap whereby the parts of the peeler trap optionally may be used as retainers for the solid portion of the refuse or for water separated from the refuse.

In conclusion, it is pointed out that while the illustrated example constitutes a practical embodiment of my invention, I do not limit myself to the exact details shown, since a modification of same may be made without departing from the spirit and scope of this invention.

Having described the invention, I claim:

1. A peeler trap comprising, a box-like receptacle having a refuse inlet, two adjacent corners of said receptacle each forming substantially ninety degree angles at their apex, the two remaining corners of said receptacle being curves of small radii producing a smoothly contoured exterior on three sides, a strainer comprised of a perforated resilient sheet rectangular in preform but having at least one vertical crease formed therein to provide at least two rectangular sides of unequal lengths, said strainer being positioned vertically in the receptacle and being held in place under compression between opposite walls of said receptacle to divide the receptacle into two parts, an edge of the longer of said two unequal length sides being positioned in the apex of one of said ninety degree corners, an edge of the shorter of said two unequal length sides bearing against the wall of the receptacle between the two contoured corners.

2. A peeler trap comprising, a box-like receptacle having a refuse inlet, two adjacent corners of said receptacle each forming substantially ninety degree angles at their apex, the two remaining corners of said receptacle being curves of small radii producing a smoothly contoured exterior on three sides, a strainer comprised of a perforated resilient sheet rectangular in preform but having at least one vertical crease formed therein to provide at least two rectangular sides of unequal lengths, and a stop member attached to the bottom of said receptacle, said strainer being positioned vertically in the receptacle and being held in place under compression between opposite walls of said receptacle to divide the receptacle into two parts, an edge of the longer of said two unequal length sides being positioned in the apex of one of said ninety degree corners, an edge of the shorter of said two unequal length sides bearing against the wall of the receptacle between the two contoured corners, the bottom of said sheet bearing against said stop member.

3. A peeler trap comprising, a box-like receptacle having a refuse inlet, two adjacent corners of said receptacle each forming substantially ninety degree angles at their apex, the two remaining corners of said receptacle being curves of small radii producing a smoothly contoured exterior on three sides, a strainer comprised of a perforated resilient sheet rectangular in preform but having two vertical creases forming a U shape with the two rectangular sides of the U being of unequal length, said strainer being positioned vertically in the receptacle and being held in place under compression between the opposite walls of said receptacle to divide the receptacle into two parts, an edge of the longer of said two unequal length sides being positioned in the apex of one of said ninety degree corners, a shorter of said two unequal length sides bearing against the wall of the receptacle between the two contoured corners.

4. A peeler trap comprising, a box-like receptacle having a refuse inlet, two adjacent corners of said receptacle each forming substantially ninety degree angles at their apex, the two remaining corners of said receptacle being curves of small radii producing a smoothly contoured exterior on three sides, a strainer comprised of a perforated resilient sheet rectangular in preform but having two vertical creases forming a U shape with the two rectangular sides of the U being of unequal length, said strainer being positioned vertically in the receptacle and being held in place under compression between opposite walls of said receptacle, an edge of the longer of said two unequal length sides being positioned in the apex of one of said ninety degree corners, an edge of the shorter of said two unequal length sides bearing against the wall of the receptacle between the two contoured corners, said strainer dividing said receptacle into two parts, one of said parts having an outlet in the bottom thereof for the solid portion of the refuse and the other of said parts having an outlet in the bottom thereof for water separated from the refuse.

References Cited in the file of this patent

UNITED STATES PATENTS

| | | |
|---|---|---|
| 182,464 | Mulford | Sept. 19, 1876 |
| 1,534,129 | Marden | Apr. 21, 1925 |
| 2,457,940 | Swenson | Jan. 4, 1949 |
| 2,782,931 | Haas | Feb. 26, 1957 |